United States Patent [19]
Schmidt

[11] 3,725,565
[45] Apr. 3, 1973

[54] EXPANSION MEMBER FOR SUPERCONDUCTING CABLE

[75] Inventor: Fritz Schmidt, Erlangen, Germany

[73] Assignee: Siemens Aktiengesellschaft, Munich, Germany

[22] Filed: Apr. 21, 1972

[21] Appl. No.: 246,155

[30] Foreign Application Priority Data

Apr. 22, 1971 Germany..................P 21 19 696.3

[52] U.S. Cl.................174/13, 138/121, 174/DIG. 6, 174/15 C, 174/21, 285/DIG. 5, 285/226
[51] Int. Cl. ......................H02g 15/26, H01v 11/00
[58] Field of Search...174/DIG. 6, 13, 15 C, 12, 12 BH, 174/21, 28; 138/114, 118, 120, 121; 285/DIG. 5, 226, 227, 301

[56] References Cited

UNITED STATES PATENTS

| | | | |
|---|---|---|---|
| 409,183 | 8/1889 | De Ferranti | 174/13 |
| 3,453,716 | 7/1969 | Cook | 174/DIG. 6 |
| 3,397,720 | 8/1968 | Jones | 174/DIG. 6 |
| 3,675,042 | 7/1972 | Merriam | 174/15 C |
| 3,549,780 | 12/1970 | Graneau | 174/21 R |
| 3,369,829 | 2/1968 | Hopkins | 285/226 X |
| 3,127,200 | 3/1964 | Sayag | 285/227 X |
| 3,084,957 | 4/1963 | Caldwell | 285/226 X |

FOREIGN PATENTS OR APPLICATIONS

| | | | |
|---|---|---|---|
| 609,140 | 11/1960 | Canada | 285/227 |
| 1,133,447 | 7/1962 | Germany | 174/13 |
| 1,182,500 | 2/1970 | Great Britain | 174/DIG. 6 |
| 1,948,520 | 4/1971 | Germany | 174/DIG. 6 |

Primary Examiner—Bernard A. Gilheany
Assistant Examiner—A. T. Grimley
Attorney—Hugh A. Chapin

[57] ABSTRACT

An expansion member for superconducting cable, designed to compensate for the expansion and contraction of the cable, having two corrugated tubes is arranged between the rigid tubes of the superconducting cable with transition sections connecting the corrugated tubes to the rigid tubes. The corrugated portions of the expansion member enables the expansion member to expand and contract. Bushings guide such expansion and there are stops provided to limit the amount of expansion. Wires or braids are provided to control the expansion.

11 Claims, 2 Drawing Figures

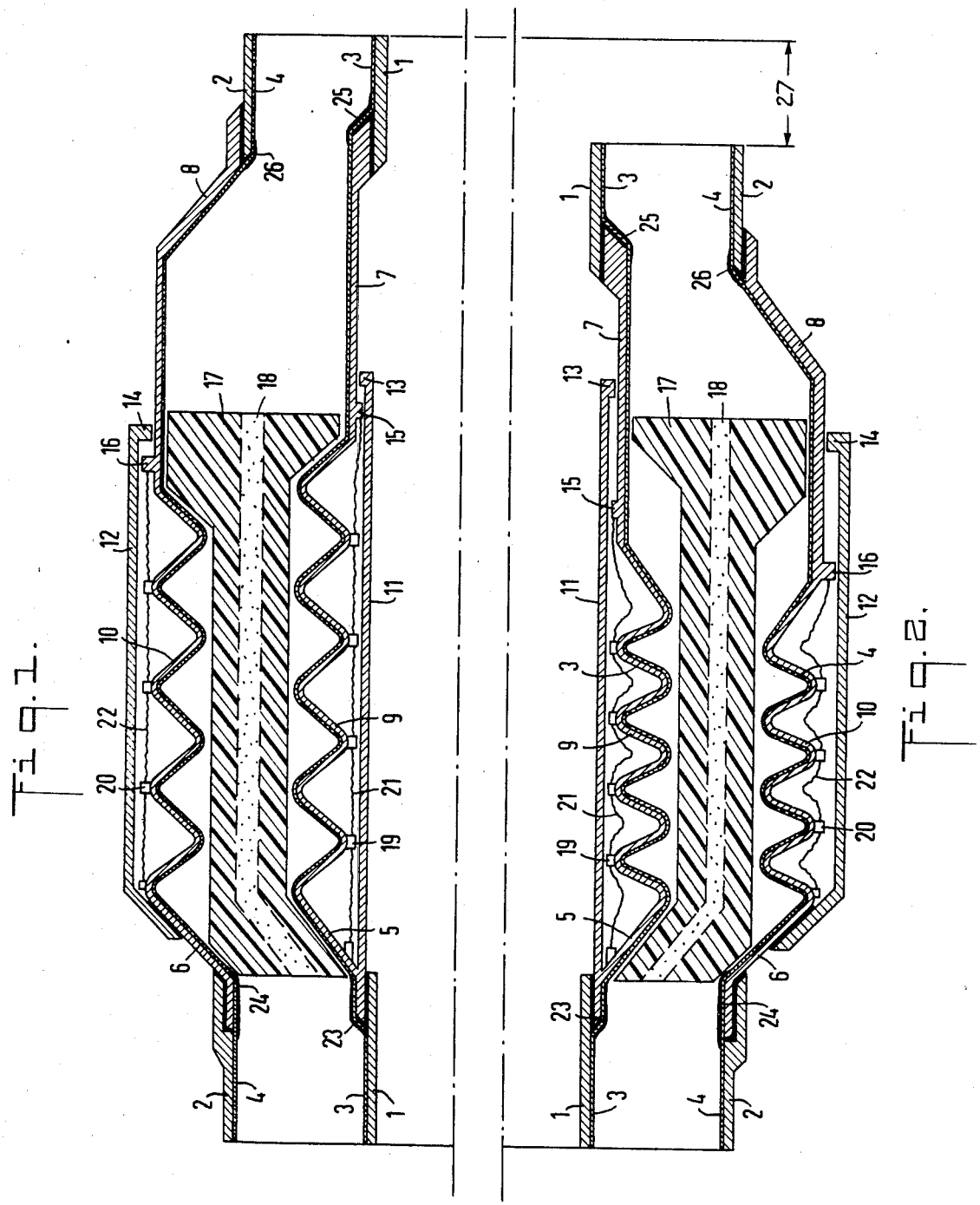

EXPANSION MEMBER FOR SUPERCONDUCTING CABLE

BACKGROUND OF THE INVENTION

1. Field of the Invention

The present invention relates to superconducting cable and more particularly to an expansion member for superconducting cable designed to compensate for the expansion and contraction of the material from which the carrier tubes within the cable are made.

2. Description of the Prior Art

In the field of superconducting cables, it is known to apply the superconducting material to tubes of highly purified metal, such as copper or aluminum. Such metals are normal conductors of electricity at the operating temperature of, for instance, approximately 4 to 5 degrees K and have a high electric conductivity. This type of construction is also particularly suited for single- or three-phase alternating-current cables in which a concentric tube arrangement is used for each phase. Here, the inner tube serves as the outgoing conductor and the outer tube as the return conductor, the phases being linked outside of the cable proper. The electromagnetic field develops here only between the inner and the outer conductor. At power line frequencies, pure metals, such as niobium or lead, have been found best suited as superconducting materials for single- and three-phase cables. Such pure metals exhibit only very low hysteresis losses if the critical field strength $H_{ci}$ is not exceeded. In the event of abnormal operating conditions, such as short circuit or overload, the tubes of copper or aluminum serve for the electrical stabilization of the superconductor and take over the current in the event that the superconductor should change completely or partially to the normal-conducting state.

In order to avoid eddy current losses in the highly conductive copper or aluminum tubes, the superconducting material is applied in single- and three-phase cables on the outside of the inner tube and on the inside of the outer tube. The outgoing and the return conductors are advantageously insulated from each other by a high vacuum or liquid helium at supercritical pressure ($P > 2.3 \cdot ^{b105}$ $N/m^2$, or 2.3 atmg), in order to avoid two-phase flow, which leads to complications also from a hydraulic point of view. In order to brace the two tubes against each other, high-voltage resistant supports are required. The losses from such supports are hardly of importance, if they are spaced at sufficiently large intervals. The tubes are arranged in another protective tube, which is evacuated for the purpose of thermal insulation. Between the coaxial tubes of the cable and the outer protective tube, a radiation shield of metal, such as copper, may be provided. This shield is cooled, for instance, by liquid nitrogen.

When a superconducting cable of the type described is put in operation, difficulties occur due to the contraction of the material of which the carrier tubes consist and which, at the temperature of the helium, is about 0.32 percent for copper and 0.42 percent for aluminum. One can therefore expect shrinkages of about 32 to 42 cm for each 100 meters of cable length when it is cooled down to the operating temperature of about 4° to 5° K. A compensation for these contractions can be achieved by expansion members which are inserted into the rigid tubes. Closer investigations now have shown that the conditions for the proper functioning of such expansion members in a superconducting cable can be maintained only if a number of important requirements are met. This applies particularly for alternating-current cables, in which an increase in the a-c losses occurring in the expansion members over that in the rigid cable sections would make necessary an increased flow of helium and therefore increased expenditure for the coolant.

SUMMARY OF THE INVENTION

It is therefore an object of the invention to provide an expansion member for superconducting cables, in which the superconductor material is arranged on the inside of a rigid outer tube and on the outside of a rigid inner tube of normally-conducting material. The operational requirements for such an expansion member can be met according to the invention by inserting into both rigid tubes normally-conducting corrugated tubes which are coated with superconductor material. The inner corrugated tube is connected to the rigid inner tube by means of flared conical transition sections and has a minimum diameter which is greater than that of the rigid inner tube in such a manner that the magnetic field strength at the outer surface of the inner corrugated tube does not exceed the magnetic field strength at the outer surface of the rigid inner tube. Both corrugated tubes are held centrically with respect to each other and to the exis of the cable by means of guide elements.

By this design, allowance is made for the consideration that on the surface of the superconductor located on the rigid inner tube a maximum magnetic field strength must not be exceeded if the a-c losses are to stay within a maximum value permissible for the cable. In the normal operation of the cable, the superconductor can be loaded with current up to this maximum magnetic field strength. In a tubular conductor the magnetic field strength at the surface is proportional to the current flowing in the conductor and inversely proportional to the diameter of the conductor. If one now considers, instead of a rigid tubular conductor, a corrugated tube equipped with a superconducting layer, it has been found that in the depressions formed by the corrugations of the corrugated tube, which are followed by the current flowing in the superconducting layer, the magnetic field of the current flowing into the depressions becomes effective as well as the magnetic field of the current flowing out of the depressions. The magnetic field strength at the surface of the corrugated tube is thereby increased.

In the expansion member provided by this invention, provision is made through appropriate design of the minimum diameter of the corrugated inner tube which is connected to the rigid inner tube by means of flared conical transition sections, that the magnetic field strength at the outer surface, covered with superconducting material, of the corrugated tube does not exceed the magnetic field strength at the surface of the rigid tubular inner conductor. The result is thereby achieved that the cable can be loaded up to the maximum magnetic field strength at the surface of the tubular inner conductor, without the occurrence of increased a-c losses in the expansion member. How large the minimum diameter of the inner corrugated tubes must be in an individual case depends on the extent to which the corrugated tube is collapsed in the operation of the cable. For the extreme case where the corrugated tube is pushed together so tightly that the individual corrugations practically touch each other, the magnetic field at the surface is increased approximately by a factor of two over that of a smooth tube of the same diameter. The minimum diameter of the corrugated tube must then be twice as large as the diameter of the rigid inner tubes in order to comply with the condition for the magnetic field at its surface. If the corrugated tube is pushed together less, the magnetic field at its surface is increased less, and the corrugated tube can have a smaller minimum diameter. In any event, however, the minimum diameter of the corrugated tube must be larger than the diameter of the rigid inner tube.

The deviation of the corrugated tubes from the concentric geometry has been found to have a critical influence on the development of losses. If the inner corrugated tube, in its entirety or in part, is not located concentrically with the axis of the tube, the magnetic field is increased on the side on which the inner corrugated tube is closer to the outer tube, while it decreases on the opposite side. It can be shown by calculation that any excentric location of the inner conductor leads to an increase in the losses, even if at the narrowest point the critical magnetic field $H_{cl}$ is not exceeded. Through the concentric guidance of the corrugated tubes as provided by this invention, such a-c losses are avoided.

It is also advantageous to connect the corrugated outer tube to the rigid outer tube of the cable by flared conical transition sections. Although the magnetic field strength at the rigid outer tube, which serves as the return conductor, and also at the corrugated tube inserted into it, is smaller than at the rigid inner tube because of the larger diameter, the dielectric strength required between the inner and the outer corrugated tubes may necessitate a minimum distance between them which is at least equal to the distance between the rigid tubes.

The means for guiding the corrugated tubes may consist of metallic material and in that case must be arranged in a field-free space, i.e., on the inside of the inner corrugated tube and on the outside of the outer corrugated tube. Besides or instead or metallic guidance means, plastic materials with low loss angle can be used, which can then be arranged in the space between the two corrugated tubes. Bushings, which are equipped with stops for limiting the expansion distance of the corrugated members, may serve advantageously as guide elements.

In many cases it may be further advantageous to provide means which take into consideration the relatively unfavorable elastic properties of the corrugated tubes which consist preferably of highly purified aluminum or highly purified copper. As a rule it is not possible to add admixtures to the highly purified conductor materials, such as zinc to copper, in order to improve the elastic properties because the electric conductivity is substantially reduced by such additives. It is therefore to be expected that as the cable is cooled down from one side, the corrugated members expand toward that side because of the contraction of the preceeding tubes, in which case their elastic limit may be exceeded. In order to avoid this, wires or metal braid, for instance, of alloy steel may be attached by soldering or welding at the individual ribs of the corrugated tubes in such a manner that local overstressing of the corrugated members is prevented. The wires or metal braids must be situated in a field-free space, i.e., on the inside of the inner corrugated tube and on the outside of the outer corrugated tube.

Further properties and advantages of the expansion member according to this invention will be described with reference to an example of a preferred embodiment which is schematically shown in the attached drawings.

DESCRIPTION OF THE DRAWINGS

FIG. 1 is a cross section of a portion of the expansion member in its expanded configuration, showing the upper half of the expansion member with reference to the center line.

FIG. 2 is a cross section of a portion of the expansion member in its contracted configuration, showing the lower half of the expansion member with reference to the center line.

DESCRIPTION OF THE PREFERRED EMBODIMENT

FIGS. 1 and 2 each show a portion of the preferred embodiment of an expansion member according to this invention in longitudinal cross section. FIG. 1 shows the upper half of an expansion member in the expanded configuration. FIG. 2 shows the lower half of an expansion member in the contracted configuration.

The normally-conducting rigid inner tube of the cable is designated as 1. The normally-conducting rigid outer tube is designated as 2 and is disposed concentrically to the rigid inner tube 1.

The rigid inner tube 1 is partially inserted into the inner transition sections 5 and 7. The rigid outer tube 2 is partially inserted into the ends of outer transition sections 6 and 8. The inner transition sections 5 and 7 are disposed at each end of corrugated inner tube 9. The outer transition sections 6 and 8 are disposed at each end of corrugated outer tube 10. In this embodiment, the inner transition sections 5 and 7 are integral with corrugated inner tube 9 and outer transition sections 6 and 8 are integral with corrugated outer tube 10. Other embodiments may be designed in which the transition sections 5,6,7 and 8 are not integral with the corrugated tubes 9 and 10. The corrugated inner tube 9 is disposed concentrically inside of corrugated outer tube 10. The two inner transition sections 5 and 7 and the two outer transition sections 6 and 8 each have a flared portion which is conical in shape. The minimum distance between the outer and inner corrugated tubes 9 and 10 is at least equal to the distance between the outer and inner rigid tubes 1 and 2.

Superconducting layer 3 is applied as a coating to the outside surfaces of rigid inner tube 1, corrugated inner tube 9, and inner transition sections 5 and 7. Superconducting layer 4 is applied as a coating to the inner surfaces of rigid outer tube 2, corrugated outer tube 10, and outer transition sections 6 and 8.

An inner metal bushing 11 is disposed inside of the corrugated inner tube 9 and an outer metal bushing 12 is disposed outside of the corrugated outer tube 10.

Both bushings 11 and 12 are for purposes of guiding the corrugated tubes 9 and 10 concentrically. Stops 13 and 14 on the metal bushings 11 and 12 cooperate with stops 15 and 16 on the transition sections 7 and 8 to limit the expansion distance 27 (FIG. 2) of the expansion member. Stop 13 is located at one end of the outer surface of the inner bushing 11. Stop 14 is located at one end of the inner surface of the outer bushing 12. Step 15 is located on the inner surface of the inner transition section 7. Stop 16 is located on the outer surface of the outer transition section 8.

A spacer 17 of plastic material is inserted between the two corrugated tubes 9 and 10. Spacer 17 is provided with a longitudinal canal 18 through the center of the spacer 17 for the passage of the cooling medium which also serves as the electrical insulation. In the case of vacuum insulation between the inner conductor and the outer conductor, the canal 18 facilitates the evacuation of the space between the inner and outer conductor of the cable.

Each of the individual ribs of the corrugated tubes 9 and 10 are welded at points such as those designated as 19 and 20, respectively, to inner wire 21 and outer wire 22. The length of wires 21 and 22 is chosen so that when they stretch out in the expanded configuration (FIG. 1) of the expansion member, they force the individual ribs of each corrugated tube 9 and 10 to have the same distance between adjacent ribs and thereby prevent local overstressing.

The minimum diameter of the inner corrugated tube 9 at the transition sections 5 and 7 is greater in dimension than the minimum diameter of the rigid inner tube 1 of the cable so that the magnetic field strength at the outer surface of the inner corrugated tube does not exceed the magnetic field strength at the outer surface of the rigid inner tube.

The corrugated tubes can advantageously be fabricated from copper or aluminum tubes of the highest purity, which are first coated by electroplating or electrolysis by precipitation of the superconducting material from the gaseous phase or by vapor deposition of the superconducting material and are subsequently made into a corrugated tube by known methods. The applied superconducting layers are relatively thin. It may therefore be of advantage to make the superconducting layers thicker at points 23, 24, 25 and 26 in FIGS. 1 and 2, at the ends of the transition sections of the corrugated tubes so that they can be welded to the superconducting layers of the rigid tubes. It has been found that, for instance, by electron-beam welding a connection of the superconducting layers can be obtained, the current-carrying capacity of which is equivalent to that of the smooth tubes.

The design shown in FIGS. 1 and 2 is applicable even if pressure (in amount of several $10^5$ N/m$^2$ or several atmg) acts upon the corrugated tubes from the outside in case vacuum insulation is used between the outgoing and the return conductors, due to the cooling medium which then is situated outside of the outer conductor and inside the inner conductor. Even under such conditions, local overstressing, excentricity and bends are prevented by the guidance means.

The use of expansion members according to the invention makes it possible to manufacture long cable sections for d-c as well as for a-c three-phase operation of smooth tubes, which can be made with high dielectric strength. The complete compensation for the contractions prevents the development of mechanical stresses and therefore makes possible relatively light supports and small heat leaks. The points at which the expansion members are inserted into the cables provide design possibilities for the junctions of lengths of rigid tubing and for the connection of vacuum pumps in the case of cables with vacuum insulation.

In the foregoing, the invention has been described in reference to a specific exemplary embodiment. It will be evident, however, that variations and modifications, as well as the substitution of equivalent constructions and arrangements for that shown for illustration, may be made without departing from the broader scope and spirit of the invention as set forth in the appended claims. The foregoing specification and drawings are accordingly to be regarded in an illustrative rather than in a restrictive sense.

What is claimed is:

1. An expansion member for superconducting cables of the type having a rigid outer tube and a rigid inner tube disposed within the rigid outer tube, comprising:
   a. a corrugated outer tube of normally-conducting material;
   b. a corrugated inner tube of normally-conducting material which is disposed inside of the corrugated outer tube;
   c. two outer transition sections, one of which is disposed at each end of the corrugated outer tube, the rigid outer tube being connected to the outer transition sections;
   d. two inner transition sections, one of which is disposed at each end of the corrugated inner tube, the rigid inner tube being connected to the inner transition sections;
   e. superconducting layers which are applied as a coating to the outside surfaces of the rigid inner tube, the corrugated inner tube and the inner transition sections and to the inner surfaces of the rigid outer tube, the corrugated outer tube and the outer transition sections;
   f. guide elements holding said corrugated tubes centrically with respect to each other and to the axis of the cable;
   g. said two inner transition sections each have a flared portion which is conical in shape, the minimum diameter of the inner corrugated tube being greater than the minimum diameter of the rigid inner tube so that the magnetic field strength at the outer surface of the inner corrugated tube does not exceed the magnetic field strength at the outer surface of the rigid inner tube.

2. An expansion member for superconducting cables according to claim 1, wherein the two outer transition sections each have a flared portion which is conical in shape.

3. An expansion member for superconducting cables according to claim 2, wherein the minimum distance between the outer and inner corrugated tubes is at least equal to the distance between the outer and inner rigid tubes.

4. An expansion member for superconducting cables according to claim 1, wherein at the points where the rigid tubes are connected to the transition sections of the corrugated tubes the superconducting layers are thicker and are welded together.

5. An expansion member for superconducting cables according to claim 1, and further comprising an inner wire which is connected to the individual ribs of the corrugated inner tube and an outer wire which is connected to the individual ribs of the corrugated outer tube, the length of the wires being such that in the expanded configuration of the expansion member the wires force the individual ribs of each corrugated tube to have the same distance between adjacent ribs and thereby prevent local overstressing.

6. An expansion member for superconducting cables according to claim 1, wherein the guide elements comprise an outer bushing disposed outside of the outer corrugated tube and an inner bushing disposed inside of the inner corrugated tube.

7. An expansion member for superconducting cables according to claim 6, and further comprising stops at one end of the inner surface of the outer bushing, on the outer surface of one of the outer transition sections, at one end of the outer surface of the inner bushing and on the inner surface of one of the inner transition sections, said stops being for the purpose of limiting the expansion of the expansion member.

8. An expansion member for superconducting cables according to claim 1, wherein the corrugated tubes are made of copper.

9. An expansion member for superconducting cables according to claim 1, wherein the corrugated tubes are made of aluminum.

10. An expansion member for superconducting cables according to claim 1, wherein the guide elements comprise a spacer disposed between the corrugated outer tube and the corrugated inner tube, said spacer having a longitudinal canal to allow the passage of a cooling medium.

11. An expansion member for superconducting cables according to claim 10, wherein the spacer is made of plastic.

* * * * *

UNITED STATES PATENT OFFICE
CERTIFICATE OF CORRECTION

Patent No. 3,725,565   Dated April 3, 1973

Inventor(s) Fritz Schmidt

It is certified that error appears in the above-identified patent and that said Letters Patent are hereby corrected as shown below:

Column 1, line 45 change "$P > 2.3 \cdot 6105 N/m^2$, or 2.3 atmg" to read --$P > 2.3 \cdot 10^5 N/m^2$, or 2.3 atmg--;

Column 5, line 9, change "step" to read --stop--.

Signed and sealed this 19th day of February 1974.

(SEAL)
Attest:

EDWARD M. FLETCHER, JR.
Attesting Officer

C. MARSHALL DANN
Commissioner of Patents